(12) United States Patent
Bellego

(10) Patent No.: US 9,020,724 B2
(45) Date of Patent: Apr. 28, 2015

(54) ELECTRIC BRAKING DEVICE FOR VEHICLES

(75) Inventor: Laurent Bellego, Versailles (FR)

(73) Assignee: Renault S.A.S., Boulogne Billancourt (FR)

( * ) Notice: Subject to any disclaimer, the term of this patent is extended or adjusted under 35 U.S.C. 154(b) by 587 days.

(21) Appl. No.: 11/720,153

(22) PCT Filed: Nov. 21, 2005

(86) PCT No.: PCT/FR2005/050974
§ 371 (c)(1),
(2), (4) Date: May 24, 2007

(87) PCT Pub. No.: WO2006/056714
PCT Pub. Date: Jun. 1, 2006

(65) Prior Publication Data
US 2008/0015761 A1    Jan. 17, 2008

(30) Foreign Application Priority Data

Nov. 25, 2004 (FR) ...................................... 04 52756

(51) Int. Cl.
*G06G 7/00* (2006.01)
*B60T 13/74* (2006.01)

(52) U.S. Cl.
CPC ...................................... *B60T 13/74* (2013.01)

(58) Field of Classification Search
CPC ........ B60T 7/12; B60T 7/122; B60T 2201/06
USPC ............................................. 701/70; 303/20
See application file for complete search history.

(56) References Cited

U.S. PATENT DOCUMENTS

| | | | |
|---|---|---|---|
| 4,561,527 A | | 12/1985 | Nakamoto et al. |
| 4,639,047 A | * | 1/1987 | Imanaka ......................... 303/15 |
| 5,139,315 A | * | 8/1992 | Walenty et al. ................ 303/162 |
| 5,735,579 A | | 4/1998 | Wood et al. |
| 5,952,799 A | | 9/1999 | Maisch et al. |
| 6,749,269 B1 | * | 6/2004 | Niwa .............................. 303/20 |
| 2001/0020800 A1 | * | 9/2001 | Isono et al. ................. 303/113.1 |
| 2001/0056544 A1 | * | 12/2001 | Walker .......................... 713/200 |
| 2002/0084154 A1 | * | 7/2002 | Peter ............................. 188/156 |
| 2002/0109407 A1 | * | 8/2002 | Morimoto et al. ........... 307/10.1 |
| 2002/0130655 A1 | * | 9/2002 | Okada et al. .................. 324/174 |
| 2003/0066719 A1 | | 4/2003 | Watanabe et al. |
| 2003/0212485 A1 | * | 11/2003 | Michmerhuizen ............ 701/200 |
| 2004/0036349 A1 | * | 2/2004 | Lin ................................. 303/15 |
| 2005/0187671 A1 | * | 8/2005 | Nada ................................ 701/1 |
| 2006/0006990 A1 | * | 1/2006 | Obradovich .................. 340/439 |

* cited by examiner

*Primary Examiner* — Redhwan K Mawari
*Assistant Examiner* — Rodney P King
(74) *Attorney, Agent, or Firm* — Oblon, McClelland, Maier & Neustadt, L.L.P.

(57) ABSTRACT

An electric braking device for a vehicle. The device includes: front wheel and/or rear wheel braking modules that are not powered when the vehicle is in a standby state; at least one on-board computer; at least one user control module which, upon a user's request, delivers a power supply control signal to control the power supply to the braking modules and braking control signals to activate the braking modules when the modules are powered; and a mechanism for cutting the power supply to the braking modules once the vehicle has zero speed and the wheels are immobilized under action of the braking modules. The device can reduce the power consumption of vehicles.

14 Claims, 3 Drawing Sheets

ELECTRIC BRAKING DEVICE FOR VEHICLES

TECHNICAL FIELD AND PRIOR ART

The invention relates to a vehicle electric braking device and, more particularly, a vehicle electric braking device that manages the standby (engine stopped) and wake-up phases of the braking system.

The vehicle electric braking systems of the known art include a large number of electric and electronic modules. In the future, vehicle electric braking systems currently known as "X-By-Wire" systems, will be increasingly complex systems in which the electricity consumption of the modules will have to be controlled. In particular, the electric and electronic architecture of the braking systems will have to be constructed taking account of the electricity consumption of the standby mode (engine stopped). Specifically, if this consumption is too high, the battery or batteries of the vehicle would risk discharging which would cause an inconvenience that may go as far as the immobilization of the vehicle.

Today standby and wake-up strategies are not taken into account in vehicle electric braking systems.

SUMMARY OF THE INVENTION

The vehicle electric braking device of the invention does not have the disadvantages mentioned above.

Specifically the invention relates to a vehicle electric braking device that comprises:

- braking modules for the front wheels and/or for the rear wheels of the vehicle, not supplied when the vehicle is in the standby state,
- at least one onboard computer,
- at least one user control module which, when it is activated by the user, delivers to the onboard computer a supply control signal to control a supply of the front wheel and/or rear wheel braking modules and, to the front wheel braking modules and/or rear wheel braking modules, braking control signals to activate the front and/or rear wheel braking modules when the braking modules are supplied, and
- means for disconnecting the supply of the front and/or rear wheel braking modules when the vehicle has a zero speed and the front and/or rear wheels of the vehicle are immobilized under the action of the braking modules.

According to an additional feature of the invention, the user control module comprises at least one sensor capable of detecting a pressure of the user on a contact element.

According to another additional feature of the invention a contact element consists of the brake pedal of the vehicle or a contact situated on the vehicle dashboard.

According to another additional feature of the invention, the contact situated on the vehicle dashboard is a button or a paddle.

According to another additional feature of the invention, in the case where the electric braking device comprises front wheel braking modules and rear wheel braking modules, the braking control signal delivered to the left front wheel braking module is also delivered to the left rear wheel braking module, and the braking control signal delivered to the right front wheel braking module is also delivered to the right rear wheel braking module.

According to another additional feature of the invention, in the case where the electric braking device comprises front wheel braking modules and rear wheel braking modules, the device comprises a first user control module and a second user control module. the braking control signal delivered by the first user control module to the left front wheel braking module is also delivered to the right rear wheel braking module, the braking control signal delivered by the first user control module to the right front wheel braking module is also delivered to the left rear wheel braking module, the braking control signal delivered by the second user control module to the left front wheel braking module is also delivered to the right rear wheel braking module and the braking control signal delivered by the second user control module to the right front wheel braking module is also delivered to the left rear wheel braking module.

According to another additional feature of the invention, in the case where the electric braking device comprises front wheel braking modules and rear wheel braking modules, the device comprises a first user control module and a second user control module, the braking control signal delivered by the first user control module to the left front wheel braking module is also delivered to the left rear wheel braking module, the braking control signal delivered by the first user control module to the right front wheel braking module is also delivered to the right rear wheel braking module, the braking control signal delivered by the second user control module to the left front wheel braking module is also delivered to the left rear wheel braking module and the braking control signal delivered by the second user control module to the right front wheel braking module is also delivered to the right rear wheel braking module.

According to another additional feature of the invention the device also comprises means for detecting a degraded operating mode of braking of the vehicle in the start state or in the start & stop mode and means capable of making it possible to brake the vehicle in the start state or in the start & stop mode with the aid of the user control module when a degraded operating mode is detected.

According to another additional feature of the invention, the device comprises a communication network for allowing the braking means to communicate with one another in order to confirm that a vehicle braking request with the aid of the user control module is required and, if the braking request is confirmed, means for maintaining the stability of the vehicle when the braking of the vehicle is applied.

BRIEF DESCRIPTION OF THE FIGURES

Other features and advantages of the invention will appear on reading the following description made with reference to the appended figures amongst which.

In all the figures, the same reference numbers indicate the same elements.

DETAILED DESCRIPTION OF EMBODIMENTS OF THE INVENTION

Figure 1:
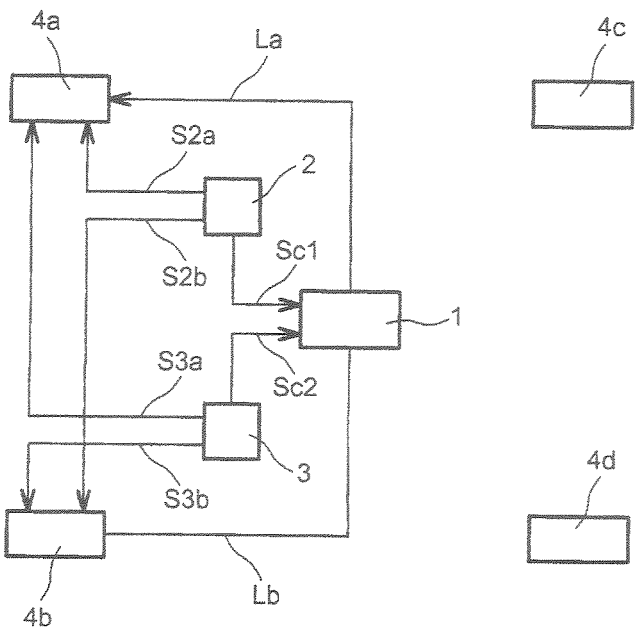
FIG. 1 represents a vehicle electric braking device according to a first embodiment of the invention.

FIG. 1 represents an electric braking device for a vehicle according to a first embodiment of the invention.

The braking system comprises a central module 1, two user control modules 2 and 3 and a set of braking modules 4a, 4b, 4c, 4d.

The central module 1 is, for example, an onboard computer fitted with a supply device. In a manner known per se, each of the braking modules 4a, 4b, 4c, 4d comprises, amongst other things, an electric motor, a reduction gear and an electronic control element. The braking modules 4a and 4b are associated with the two front wheels of the vehicle and the braking modules 4c, 4d are associated with the two rear wheels. The user control modules 2 and 3 are both connected to the central module 1 and to the front wheel braking modules 4a, 4b. Power lines La and Lb connect the supply device contained in the central module 1 to the respective modules 4a and 4b. In order to prevent the establishment of common modes on the lines La and Lb, the latter are connected to two separate outputs of the central module 1.

The user modules 2 and 3 are control devices for the braking modules 4a and 4b when the vehicle is in a standby state engine stopped). The user modules 2 and 3 control the braking modules 4a and 4b respectively via the brake pedal and a contact situated on the dashboard of the vehicle (button, paddle, etc.). When the driver of the vehicle applies a pressure to the brake pedal, the control module 2 delivers braking control signals S2a and S2b to the respective braking modules 4a and 4b and a supply control signal Sc1 to the central module 1. The module 2 may, for example, be a binary contact device that delivers the signals S2a, S2b and Sc1 in the form of binary information of which a first state indicates that contact is established with the brake pedal and a second state that no contact is established with the brake pedal. Other forms of signals, including for example more than two states, may also be delivered by the module 2.

Likewise, when pressure is applied to the contact of the user module 3, the latter delivers braking control signals S3a and S3b to the respective braking modules 4a and 4b and a supply control signal Sc2 to the central module 1. Preferably, the signals delivered by the module 3 are also binary signals.

When the vehicle is on standby, only the central module 1 is supplied. According to the first embodiment of the invention, the central module 1 directly manages the supply of the braking modules 4a, 4b of the front wheels. The signals Sc1 and/or Sc2 allow the central module 1 to detect the activation of the user control modules 2 and/or 3. Under the action of the signals Sc1 and/or Sc2, the central module 1 supplies the braking modules 4a and 4b accordingly. Under the action of the signals S2a, S2b and/or S3a, S3b, and because they are supplied, the braking modules 4a and 4b then apply the brakes associated therewith thereby allowing an immobilization of the vehicle, then lock the position of the brake pads in order to maintain the applied force. The parking brake thus being activated, the supply of the modules 4a and 4b is then disconnected.

Figure 2:
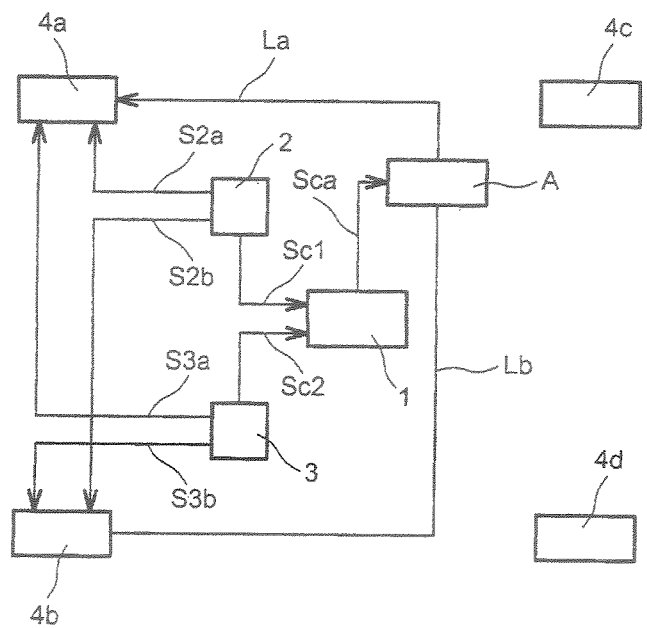
FIG. 2 represents a vehicle electric braking device according to a second embodiment of the invention.

FIG. 2 represents a second embodiment of the invention in which the supply A of the braking modules is outside the central module 1. The supply A is then controlled by a signal Sca delivered by the central module 1 under the action of the signal Sc1 and/or of the signal Sc2.

Figure 3:
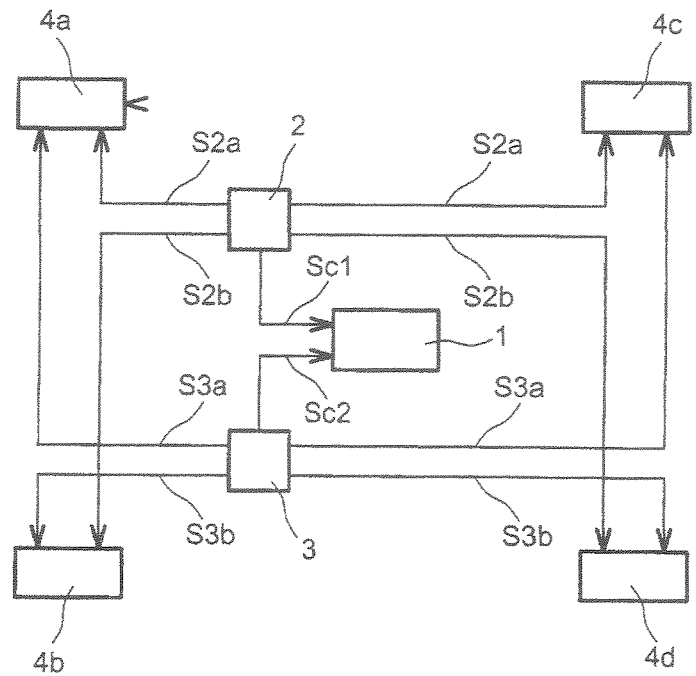
FIG. 3 represents a first enhancement of the electric braking device according to the invention.
Figure 4:
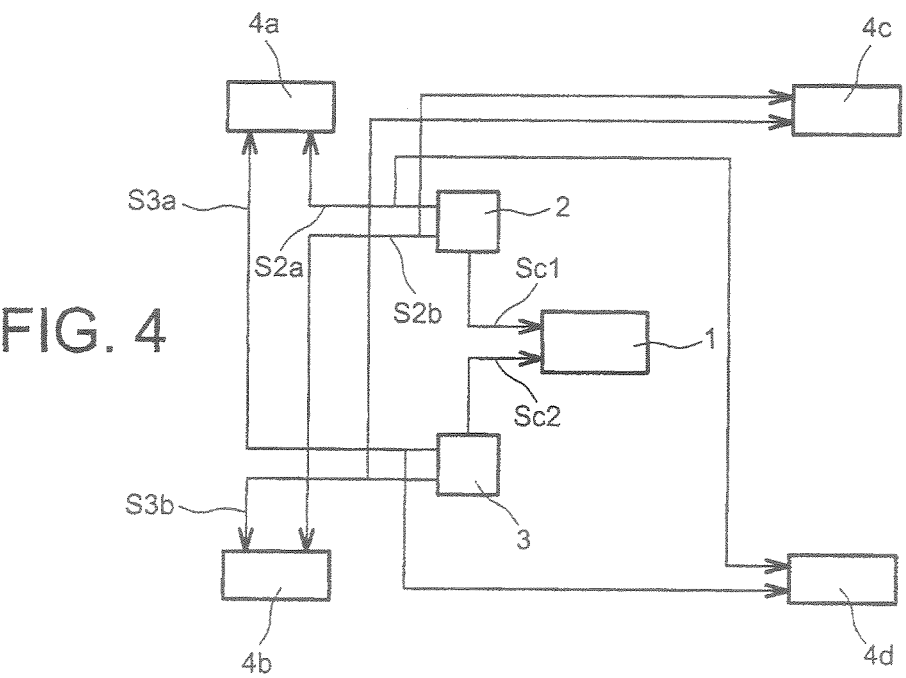
FIG. 4 represents a second enhancement of the electric braking device according to the invention.
Figure 5:
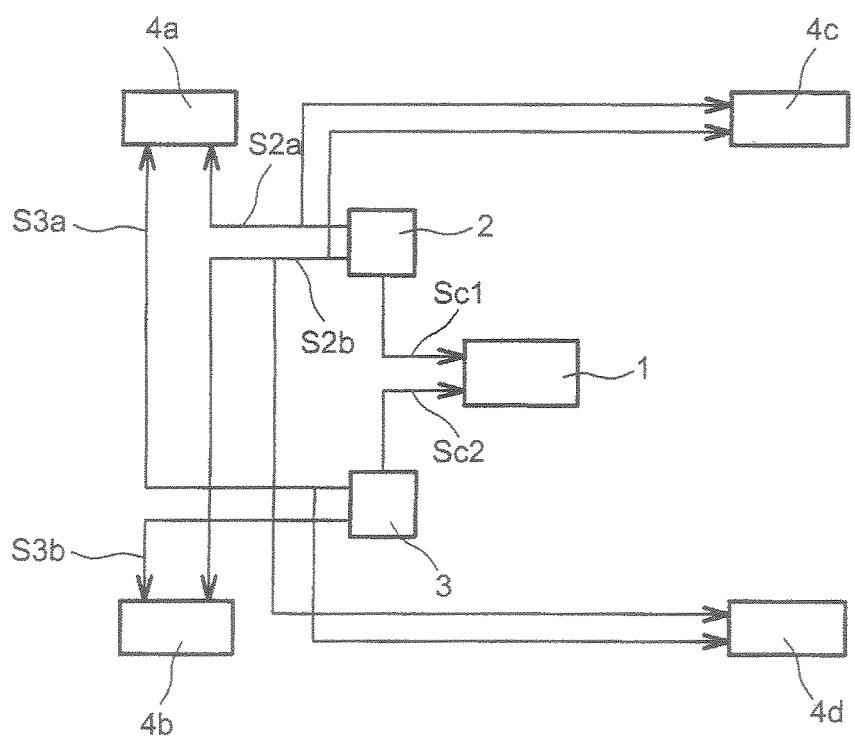
FIG. 5 represents a third enhancement of the electric braking device according to the invention.

FIGS. 3-5 represent various exemplary embodiments of the invention in which the signals Sc1 and/or Sc2 are applied not only to the braking modules of the front wheels 4a, 4b, but also to the braking modules of the rear wheels 4c, 4d. For reasons of convenience the supply lines that connect the central module 1 to the braking modules of the rear wheels 4c and 4d are not shown. However, such supply lines exist and their configuration accords with the configuration of the supply lines La and Lb of FIG. 1 or 2.

FIG. 3 represents an example of a configuration in which each module 2, 3 has two additional outputs. The signals S2a and S2b are then delivered to the two additional outputs of the module 2 and transmitted to the respective modules 4c and 4d. Similarly, the signals S3a and S3b are delivered to the two additional outputs of the module 3 and transmitted to the respective modules 4c and 4d.

FIG. 4 represents an example of a configuration in which:
the signal S2a transmitted to the module 4a is also transmitted to the module 4d and the signal S2b transmitted to the module 4b is also transmitted to the module 4c, and
the signal S3a transmitted to the module 4a is also transmitted to the module 4d and the signal S3b transmitted to the module 4b is also transmitted to the module 4c.

Such a configuration is called a "diagonal configuration" because the braking modules 4a and 4b are associated with the respective right and left front wheels and the braking modules 4c and 4d are associated with the respective right and left rear wheels.

FIG. 5 represents an example of a configuration in which:
the signal S2a transmitted to the module 4a is also transmitted to the module 4c and the signal S2b transmitted to the module 4b is also transmitted to the module 4d, and
the signal S3a transmitted to the module 4a is also transmitted to the module 4c and the signal S3b transmitted to the module 4b is also transmitted to the module 4d.

Such a configuration is called a "right/left configuration" because the braking modules 4a and 4b are associated with the respective right and left front wheels and the braking modules 4c and 4d are associated with the respective right and left rear wheels.

When a vehicle is started (that is to say when the driver has started the engine), the braking of the vehicle is carried out in a manner known per se via the brake pedal. Sensors that are placed on the brake pedal and are supplied only when the engine is running or when the conditions of stopping the engine are achieved in Start & Stop mode (engine switched off at stop but still available), make it possible to detect, on the one hand an item of information on the position or movement of the pedal and, on the other hand, an item of information on the force exerted on the pedal. During certain degraded operating modes, the item of information originating from these sensors is unusable. An advantage of the invention is then to make it possible to brake the vehicle thanks to the items of information originating from the modules 2 and/or 3.

For this purpose, the braking device according to the invention comprises means for detecting a degraded operating mode of the braking means of the vehicle in the start state or in "Start & Stop" mode and means for making it possible to brake the vehicle in the start state with the aid of the user control means when a degraded operating mode is detected. Preferably the braking device then comprises a communication network that allows the braking modules 4a, 4b and, where necessary, 4c and 4d, to communicate with one another to confirm the braking request and means for maintaining the stability of the vehicle when the braking is applied.

The nature of the connections between the control modules 2 and 3 and the braking modules 4a-4d covers a wide range of possibilities. The connections may be, for example, wire connections or wireless connections (CAN, LIN, "time trigger", etc.).

Advantageously, the invention is suitable for a large number of supply networks. It may be a 14V network, for example with two 12V batteries, a dual 14V/42V network, for example with a 12V battery and a 36V battery, or else a 42V network, for example with two 36V batteries.

In all the figures of the application, the braking device according to the invention comprises front wheel braking modules 4a, 4b and rear wheel braking modules 4c, 4d. The invention also relates to the cases where the braking device comprises only front wheel braking modules or only rear wheel braking modules. It is for reasons of convenience that these other embodiments are not shown in the figures of the application.

The invention claimed is:

1. A vehicle electric braking device, comprising:
   braking modules for front wheels and/or for rear wheels of the vehicle, that are not supplied with electricity when the vehicle is in a standby state;
   at least one onboard computer supplied with electricity when the vehicle is in the standby state and including a supply unit configured to automatically disconnect the supply of electricity to the front and/or rear wheel braking modules, after the vehicle has come to a stop, and once the vehicle has a zero speed and the front and/or rear wheels of the vehicle are immobilized under action of the braking modules such that the vehicle enters the standby state; and
   at least one user control module which, when activated by a user, delivers to the onboard computer a supply control signal to control a supply of electricity to the front wheel and/or rear wheel braking modules and delivers, to the front wheel braking modules and/or rear wheel braking modules, braking control signals to activate the front and/or rear wheel braking modules when the braking modules are supplied with electricity,
   wherein the onboard computer is configured, when the braking modules are not supplied with electricity, to connect the supply of electricity to the front and/or rear wheel braking modules in response to receiving the supply control signal to activate the front and/or rear wheel braking modules.

2. The device as claimed in claim 1, wherein the user control module includes at least one sensor configured to detect a pressure of the user on a contact element.

3. The device as claimed in claim 2, wherein the contact element includes a brake pedal of the vehicle or a contact situated on a dashboard of the vehicle.

4. The device as claimed in claim 3, wherein the contact element is situated on the vehicle dashboard and includes a button or a paddle.

5. The device as claimed in claim 1, including front wheel braking modules and rear wheel braking modules, wherein a braking control signal delivered to a left front wheel braking module is also delivered to a left rear wheel braking module, and a braking control signal delivered to a right front wheel braking module is also delivered to a right rear wheel braking module.

6. The device as claimed in claim 1, including front wheel braking modules and rear wheel braking modules, and including a first user control module and a second user control module, wherein a braking control signal delivered by the first user control module to a left front wheel braking module is also delivered to a right rear wheel braking module, a braking control signal delivered by the first user control module to a right front wheel braking module is also delivered to a left rear wheel braking module, a braking control signal delivered by the second user control module to the left front wheel braking module is also delivered to the right rear wheel braking module, and a braking control signal delivered by the second user control module to the right front wheel braking module is also delivered to the left rear wheel braking module.

7. The device as claimed in claim 1, including front wheel braking modules and rear wheel braking modules, and including a first user control module and a second user control module, wherein a braking control signal delivered by the first user control module to a left front wheel braking module is also delivered to a left rear wheel braking module, a braking control signal delivered by the first user control module to a right front wheel braking module is also delivered to a right rear wheel braking module, a braking control signal delivered by the second user control module to the left front wheel braking module is also delivered to the left rear wheel braking module, and a braking control signal delivered by the second user control module to the right front wheel braking module is also delivered to the right rear wheel braking module.

8. The device as claimed in claim 1, further comprising a communication network allowing the braking modules to communicate with one another to confirm that a vehicle braking request with aid of the at least one user control module is required and, if the braking request is confirmed, a stability unit configured to maintain stability of the vehicle when braking of the vehicle is applied.

9. The device as claimed in claim 1, wherein the supply of electricity to the front and/or rear wheel braking modules is disconnected after a parking brake is activated.

10. The device as claimed in claim 1, wherein when the vehicle is in the standby state, only the onboard computer is supplied with electricity.

11. The device as claimed in claim 1, wherein the supply control signal allows the onboard computer to detect activation of the at least one user control module.

12. The device as claimed in claim 1, wherein the at least one user control module and front wheel and/or rear wheel braking modules communicate via wireless communications.

13. The device as claimed in claim 2, wherein the contact element includes a contact situated on a dashboard of the vehicle.

14. The device as claimed in claim 2, further comprising:
   a detection unit configured to detect a degraded operating mode of the braking modules of the vehicle in a start state or in a start and stop mode and a brake actuation unit configured to brake the vehicle in the start state or in the start and stop mode with aid of the at least one user control module when the degraded operating mode is detected.

* * * * *